(12) United States Patent
Asahara et al.

(10) Patent No.: US 7,594,378 B2
(45) Date of Patent: Sep. 29, 2009

(54) MOWER TRACTOR WITH REAR GRASS COLLECTOR ASSEMBLY

(75) Inventors: Masato Asahara, Sakai (JP); Kazuo Samejima, Kaizuka (JP); Yoshikazu Togoshi, Osaka (JP); Akira Minoura, Osaka (JP); Yasunobu Nakatani, Sakai (JP); Osami Fujiwara, Kishiwada (JP)

(73) Assignee: Kubota Corporation, Osaka (JP)

( * ) Notice: Subject to any disclaimer, the term of this patent is extended or adjusted under 35 U.S.C. 154(b) by 0 days.

(21) Appl. No.: 11/075,843

(22) Filed: Mar. 9, 2005

(65) Prior Publication Data

US 2005/0217232 A1 Oct. 6, 2005

(30) Foreign Application Priority Data

Mar. 30, 2004 (JP) ............................. 2004-100506
May 14, 2004 (JP) ............................. 2004-145052

(51) Int. Cl.
*A01D 43/06* (2006.01)
(52) U.S. Cl. ......................................... 56/194; 56/202
(58) Field of Classification Search .................. 56/194, 56/196, 199, 202, 5, 16.6
See application file for complete search history.

(56) References Cited

U.S. PATENT DOCUMENTS

| | | | | |
|---|---|---|---|---|
| 3,974,631 A | * | 8/1976 | Rhodes ......................... | 56/202 |
| 4,156,337 A | * | 5/1979 | Knudson ....................... | 56/13.6 |
| 4,393,645 A | * | 7/1983 | Moore .......................... | 56/202 |
| 4,589,251 A | * | 5/1986 | Amano et al. ................. | 56/202 |
| 4,723,398 A | * | 2/1988 | Flenniken et al. ............ | 56/16.6 |
| 4,986,062 A | * | 1/1991 | Hill .............................. | 56/16.9 |
| 5,195,310 A | * | 3/1993 | Kettler et al. ................. | 56/202 |

FOREIGN PATENT DOCUMENTS

| | | | |
|---|---|---|---|
| JP | 63-98312 | | 4/1988 |
| JP | 7-25 | | 11/1990 |
| JP | 7-42270 | | 1/1992 |
| JP | 4-117219 | | 4/1992 |
| JP | 4-200315 | | 7/1992 |
| JP | 04200315 A | * | 7/1992 |
| JP | 6-9418 | | 2/1994 |

* cited by examiner

*Primary Examiner*—Alicia M Torres
(74) *Attorney, Agent, or Firm*—The Webb Law Firm

(57) ABSTRACT

A mower tractor includes a vehicle body supported by a plurality of wheels; an engine mounted to the vehicle body; a mower suspended from the vehicle body; at least one grass collector bag for collecting grass cut by the mower; a grass collector bag holder supporting said at least one grass collector bag at a position on one side with respect to the engine; and a stopper portion for abutting against the grass collector bag so as to prevent the grass collector bag supported by the grass collector bag holder from moving toward the vehicle body.

8 Claims, 19 Drawing Sheets

MOWER TRACTOR WITH REAR GRASS COLLECTOR ASSEMBLY

BACKGROUND OF THE INVENTION

The present invention relates to mower tractors provided with a grass collector bag holder supporting a suspended grass collector bag positioned to the side of a vehicle body.

As disclosed in JP Utility Model H07-42270 (see page 2, FIGS. 2, 3 and 4), for example, mower tractors are known that are provided with a frame having a guide portion (which corresponds to a grass collector bag holder) that is positioned above the engine hood and rectangular when viewed from above, and wherein three grass collector bags are removably attached to guide portions, with the two outer ones of the three grass collector bags being suspended from guide portions to the side of the engine hood (which corresponds to a vehicle body portion).

In this mower tractor, the grass collector bags may swing due to oscillations when the vehicle moves. Also, in vehicles in which the grass collector bags are suspended behind the rear wheels in order to keep the center of gravity of the vehicle from rising due to the weight of the mowed grass that has accumulated in the grass collector bags, so that the grass collector bags are positioned extremely low, sideways swinging forces may act on the grass collector bags when the vehicle tilts sideways and the grass collector bags touch the ground. In this case, the grass collector bags may swing sideways and inwards toward the vehicle body, which may damage the grass collector bags by rupturing them.

SUMMARY OF THE INVENTION

It is an object of the present invention to provide a mower tractor with which the above-described damage to the grass collector bags can be avoided with a simple structure.

To achieve this object, a mower tractor in accordance with the present invention includes:

a vehicle body supported by a plurality of wheels;
an engine mounted to the vehicle body;
a mower suspended from the vehicle body;
at least one grass collector bag for collecting grass cut by the mower;
a grass collector bag holder supporting said at least one grass collector bag at a position on one side with respect to the engine; and
a stopper portion for abutting against the grass collector bag so as to prevent the grass collector bag supported by the grass collector bag holder from moving toward the vehicle body.

That is to say, even when the grass collector bag (or bags) swings sideways, it hits against the stopper, thus preventing the grass collector bag from moving toward the vehicle body.

Consequently, the stopper portion prevents the grass collector bag (or bags) from being damaged, for example by, swinging inward towards the vehicle body and being ruptured.

DETAILED DESCRIPTION OF PREFERRED EMBODIMENTS

The following is a description of preferred embodiments of the present invention, with reference to the accompanying drawings. It should be understood that a feature described in an embodiment can be combined with features in another embodiment and that such a combination should be considered to fall within the scope of the present invention as long as such a combination does not result in any inconsistency.

Figure 1:
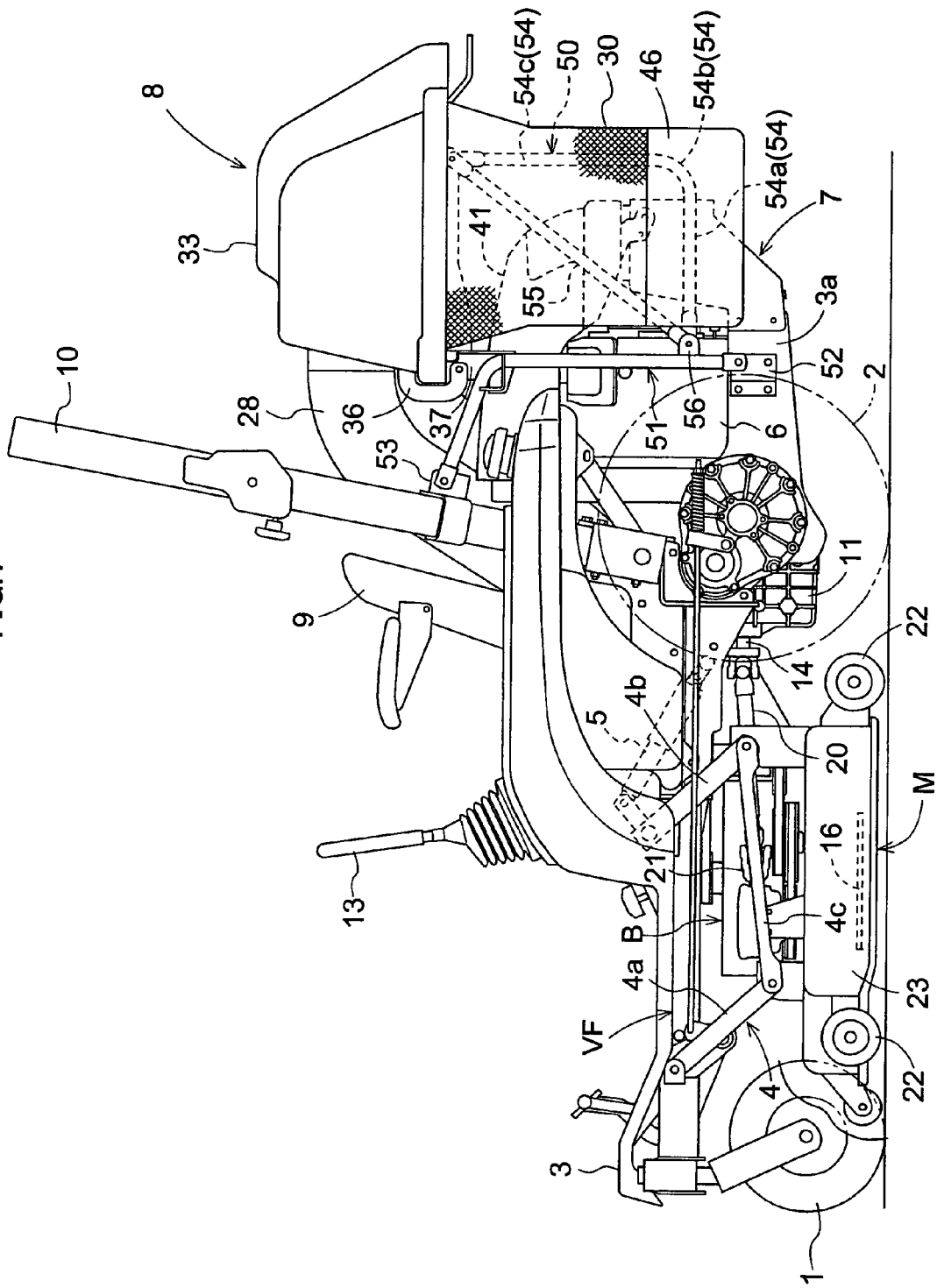
FIG. 1 is a lateral view of an entire riding-type mower tractor.
Figure 2:
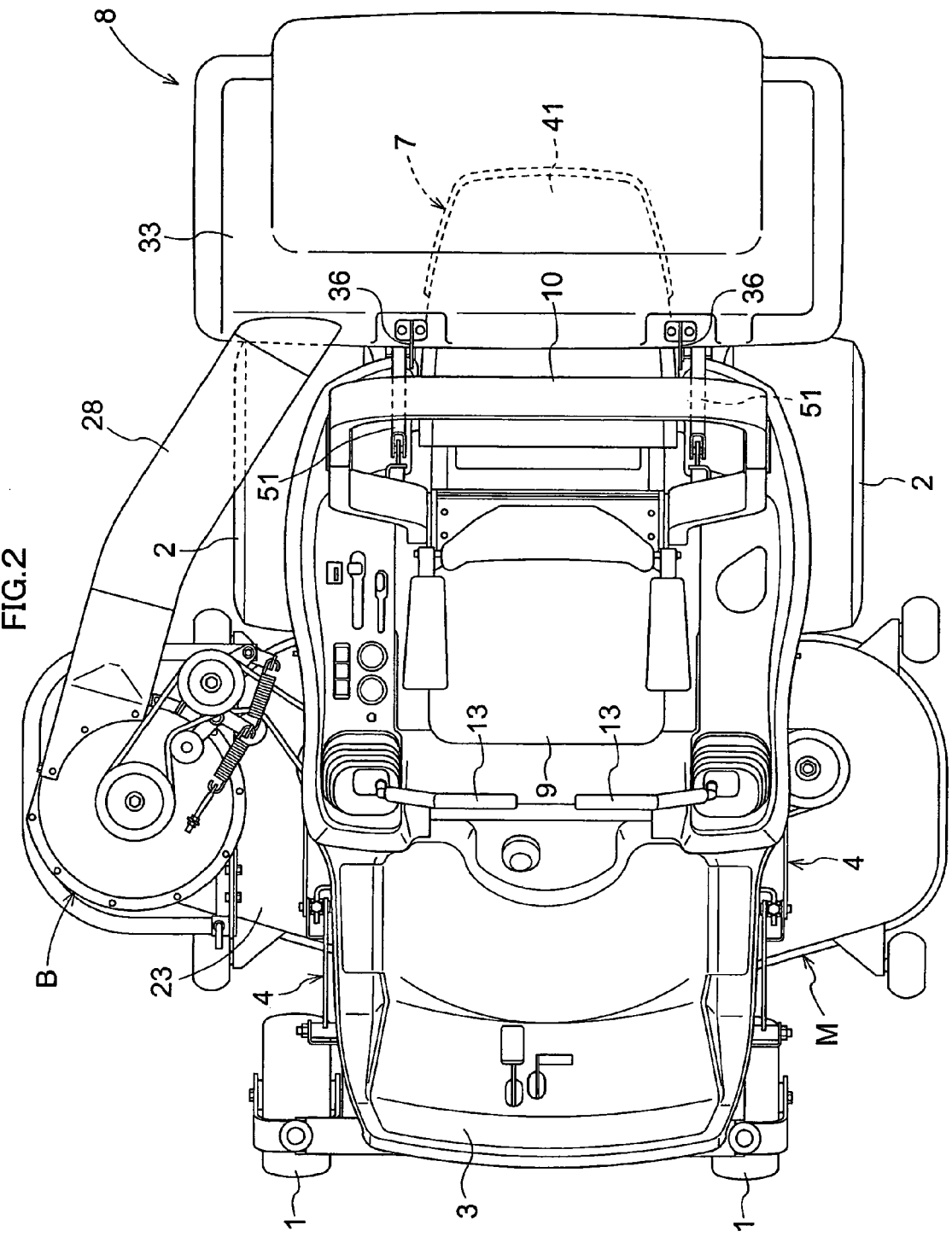
FIG. 2 is a top view of the entire riding-type mower tractor.

As shown in FIGS. 1 and 2, a riding type mower tractor for mowing a lawn or grass has a vehicle body 3 that is supported by a pair of left and right freely revolving caster-type front wheels 1 and a pair of left and right drivable rear wheels 2. This mower tractor further has an engine compartment 7 accommodating an engine 6 positioned at the rear of the vehicle body, a driving section including a driver seat 9 located to the front of and near the engine compartment 7 and a pair of left and right operating levers 13 located to the front of and near the driver seat 9, and a vehicle frame VF provided with a rollover protection frame 10. Between the front and rear wheels of the mower tractor, a mower M is linked via a linking mechanism 4. The driving force of the engine 6 is transmitted via an axial transmission mechanism 20 and a motive force output shaft 14 of a rear wheel driving case 11 to an input shaft 21 of this mower M. A grass collector 8 to which a pair of left and right grass collector bags 30 can be removably attached is provided at the rear of the vehicle body. A discharge port of a blower B positioned on one lateral side of a cutting blade housing 23 of the mower M is linked via a duct 28 to a guide cover 33 of the grass collector 8.

With this mower tractor, a hydrostatic continuously variable transmission (not shown) for the left rear wheel provided to the rear wheel driving case 11 is shifted through the action of tilting the left operation lever 13 back and forth in the vehicle's longitudinal direction. Similarly, a hydrostatic continuously variable transmission (not shown) for the right rear wheel provided to the rear wheel driving case 11 is shifted through the action of tilting the right operation lever 13 back and forth in the vehicle's longitudinal direction. Thus, it is possible to stop the vehicle by stopping the left and right rear wheels 2, or to drive the left and right rear wheels 2 forward or backward. Both the forward movement and the rearward movement are accomplished by gear-less shifting, and the vehicle is driven and steered through the varying of the driving direction and driving speed of the left and right rear wheels 2.

When a lift cylinder 5, which is linked to a rear link 4b of the link mechanism 4, is extended and contracted, the lift cylinder 5 pivots a front link 4a and the rear link 4b of the link mechanism upward and downward with respect to the vehicle frame 3. Thus, the mower M is switched between a lowered operating state in which its ground wheels 22 are lowered to the ground and a raised operating state in which its ground wheels 22 are lifted from the ground. When the mower M is in the lowered operating state and the vehicle moves, the mower M cuts the lawn or grass with rotating blades 16, which rotate around shafts arranged vertically to the vehicle body at multiple locations in the lateral direction of the vehicle inside the cutting blade housing 23. The cut lawn or grass is carried by the carrying air draft generated by the rotation of the blades 16 and the carrying air draft generated by the blower B from the cutting blade housing 23 through the duct 28 to the inside of the guide cover 33 of the grass collector 8, and collected in the pair of left and right grass collector bags 30.

Figure 3:
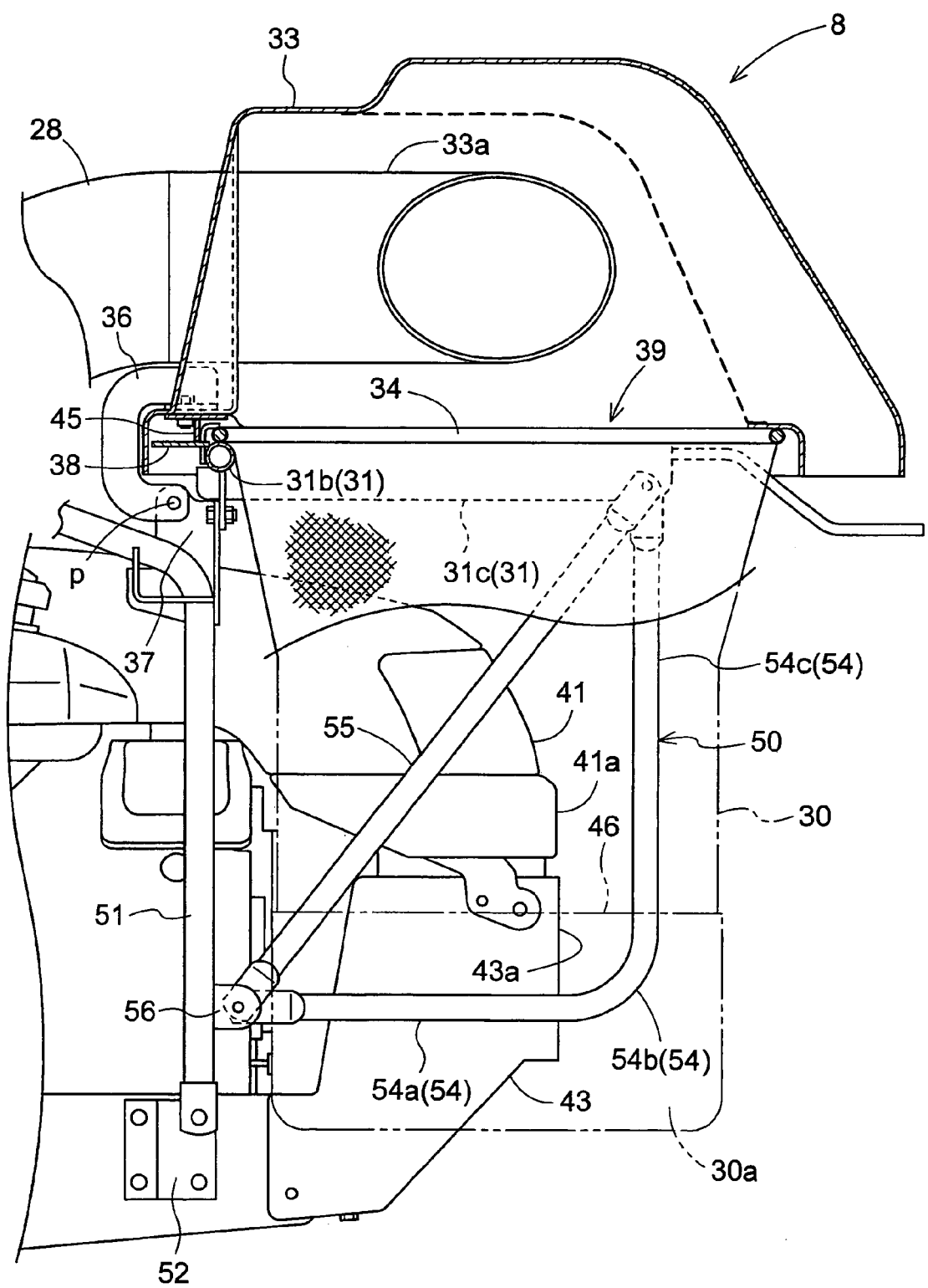
FIG. 3 is a lateral view of a grass collector.
Figure 4:
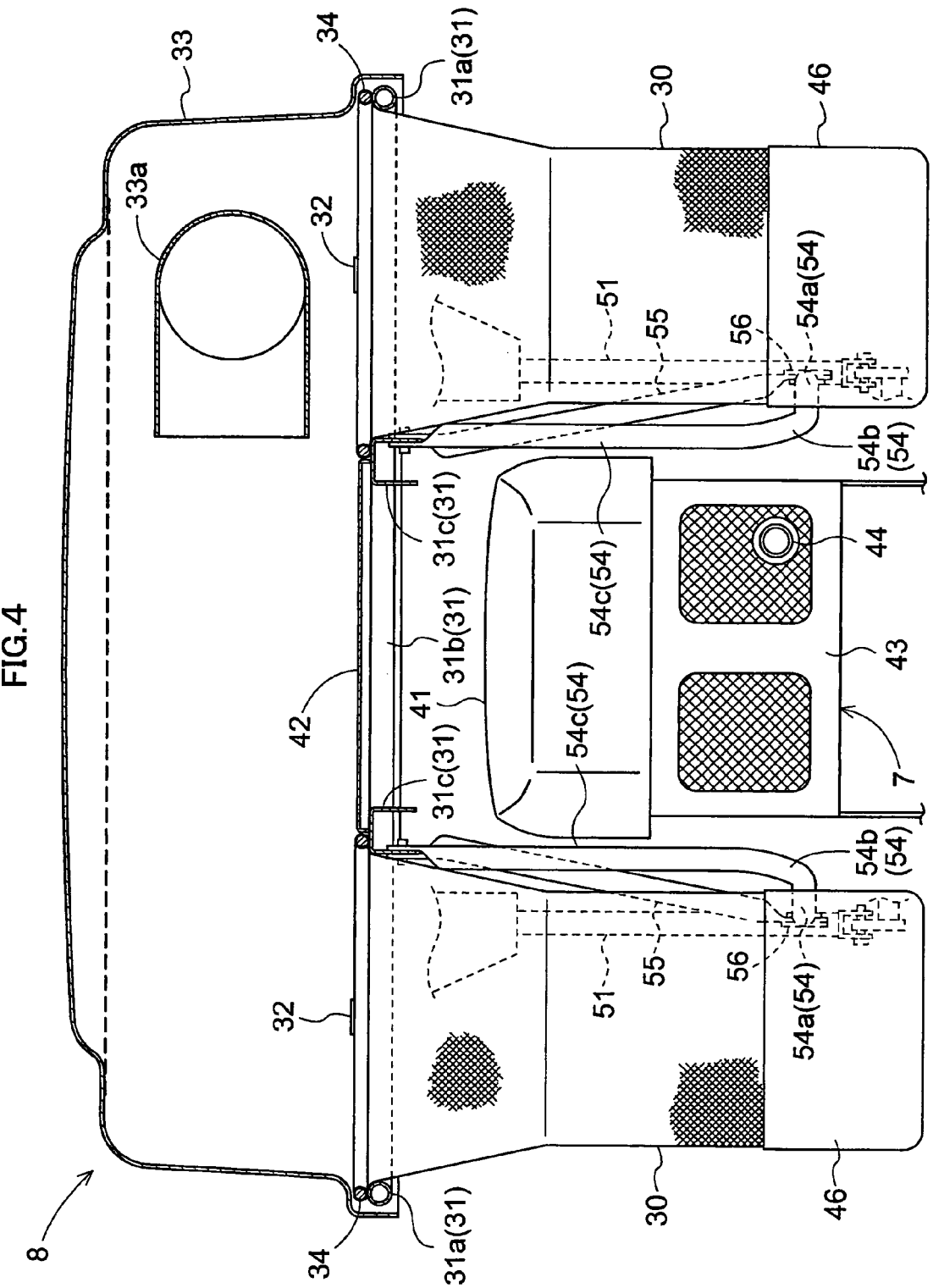
FIG. 4 is a rear view of the grass collector.
Figure 6:
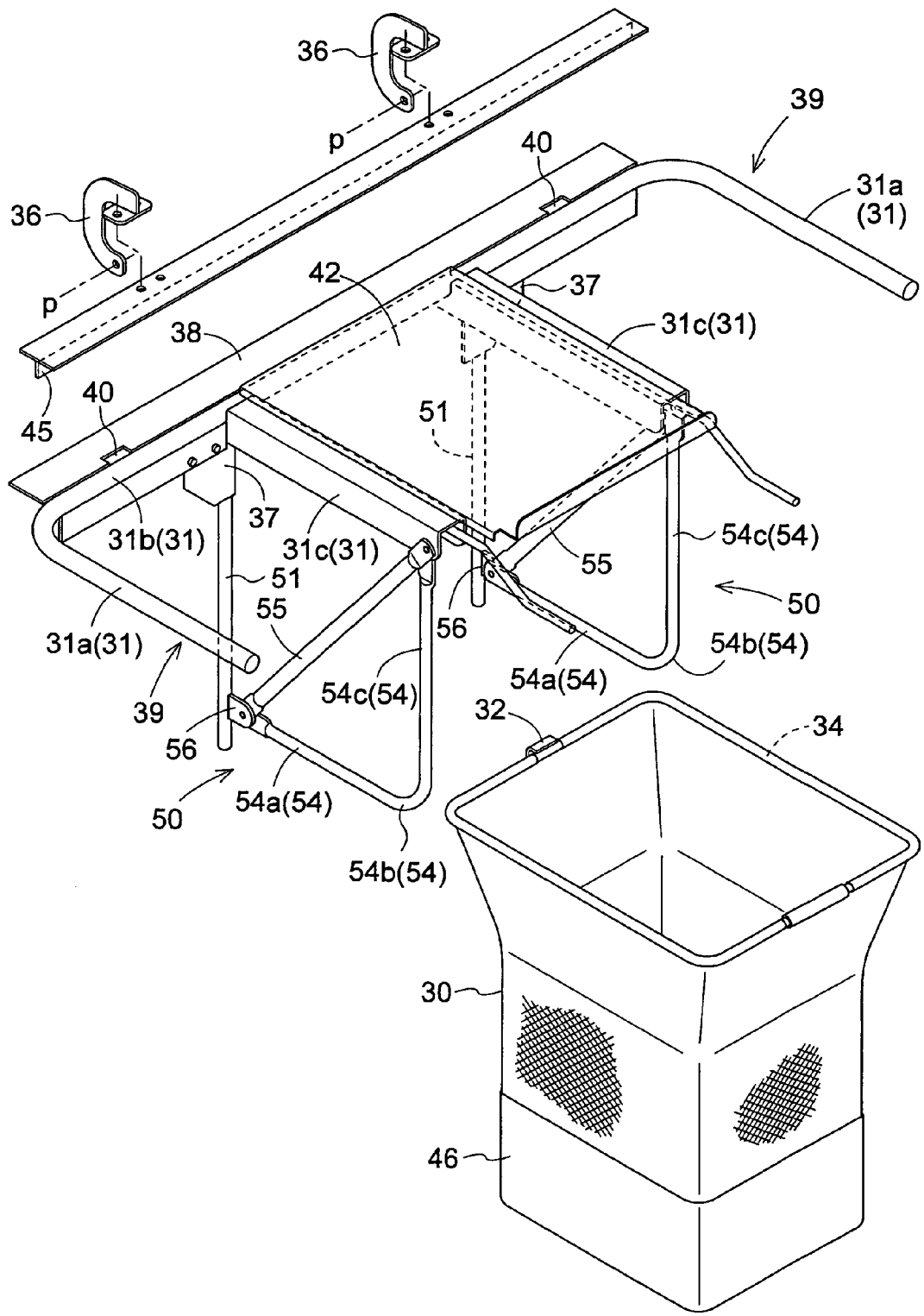
FIG. 6 is an oblique view of a grass collector bag holder.

To describe the grass collector 8 in further detail, as shown in FIGS. 3, 4 and 6 for example, the grass collector 8 includes grass collector bag holders 39, a plurality of grass collector bags 30 serving as grass containers, a guide cover 33 and a cover plate 42.

The grass collector bag holders 39 have two arms (of a bag support frame 31) located on either side the vehicle. The bag support frame 31 is fastened to, for example, the rear end 3a of the vehicle frame 3 via support bar groups 50 including main support bars 51 positioned to both sides of the engine compartment 7. The plurality of grass collection bags 30 are suspended by the left and right grass collector bag holders 39. The front end side of the guide cover 33 is linked via linking arms 36 to brackets 37 fixed to the upper end of the main support bars 51 of the left and right (with respect to the vehicle's lateral direction) of the bag support frame 31 and covers, from above, the engine hood 41 of the engine compartment 7.

As shown in FIG. 6, the bag support frame 31 includes outer support arms 31a, a linking portion 31b, and inner support arms 31c. The outer support arms 31a are made of the two ends of a bent steel pipe with round profile and extend in the vehicle's longitudinal direction. The linking portion 31b is made of the middle portion of that steel pipe with round profile and extends in the vehicle's lateral direction. The inner support arms 31c are made of sheet metal members provided with a downward-pointing groove and extend in the vehicle's longitudinal direction from two points spaced apart in the vehicle's lateral direction on the linking portion 31b. In this bag support frame 31, the grass collector bag holders 39 with grass collector bag lodging ports opening in the vehicle's rearward direction are constituted by the linking portion 31b, the outer support arms 31a, and the inner support arms 31c, on both sides of the cover plate 42.

Figure 7:
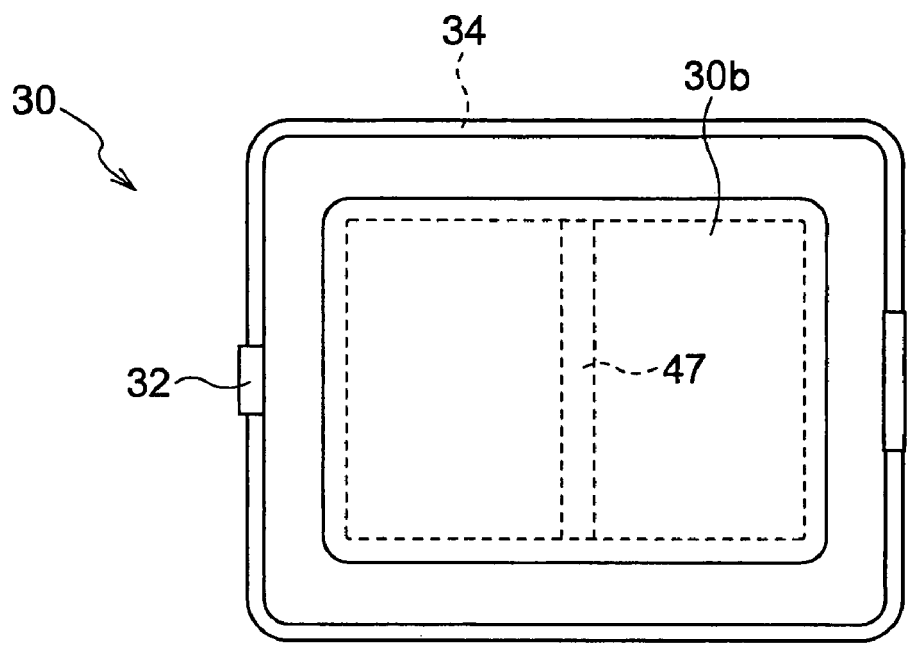
FIG. 7 is a top view of a grass collector bag.

As shown in FIGS. 6 and 7, the grass collector bag holders 39 receive the core frame members 34 of the grass collector bags 30 by positioning the core frame members 34 on the upper surface side of the linking member 31b, the outer support arms 31a and the inner support arms 31c, thus suspending the grass collector bags 30 at positions to the side behind the engine compartment 7 between the outer support arms 31a and the inner support arms 31c. The core frame members 34 are loop-shaped and are removably attached to a rectangular opening located at the upper end of the grass collector bags 30, sustaining the shape of this opening.

Each core frame member 34 has a latching portion 32 made of sheet metal, and can be positioned or inserted and latched to the grass collector bag holders 39 of a grass collector bag 30 by latching this latch portion 32 into a latch hole 40 formed by a cutout portion in a sheet metal strip 38 fastened to the bag support frame 31.

Figure 5:
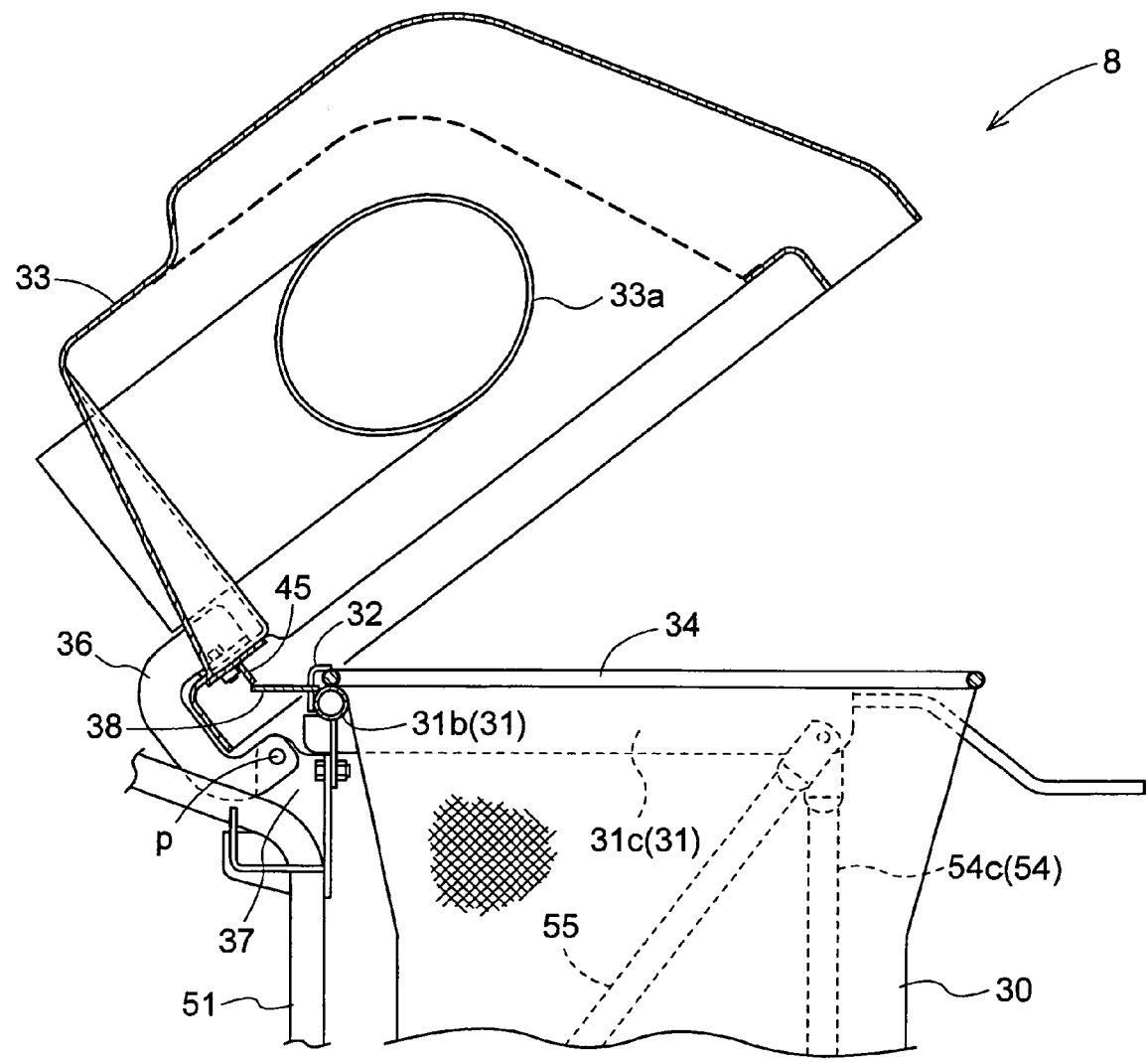
FIG. 5 is a cross-sectional view of the guide cover in its lifted and open state.

As shown in FIGS. 3 and 5, the guide cover 33 can be swung vertically around a shaft p extending in the vehicle's lateral direction and linking the linking arms 36 rotatably to the brackets 37. Thus, the guide cover 33 can be switched between a lifted open state in which the area above the two grass collector bag holders 39 is open, and a lowered closed state in which the guide cover 33 is lowered onto the bag support frame 31 and the openings of the grass collector bags 30 lodged to the grass collector bag holders 39 are covered from above. In the lifted open state, the guide cover 33 is lifted upward from the bag support frame 31, so that the grass collector bags 30 can be lodged into or dislodged from the grass collector holders 39.

That is to say, in this grass collector 8, when the grass collector bags 30 are lodged into the left and right grass collector bag holders 39 and the guide cover 33 is in the lowered closed state, the two grass collector bags 30 are suspended from the left and right grass collector bag holders 39, with one grass collector bag 30 being suspended to the left of the rear end of the engine compartment 7 (which is an example of a portion of the vehicle body) behind the rear wheels 2 and the other grass collector bag 30 being suspended to the right of the rear end of the engine compartment 7 behind the rear wheels 2. Thus, the cut lawn or grass from the duct 28 is discharged by the carry air draft from the blower B to the inside of the guide cover 33 from a discharge duct 33a located inside the guide cover 33, and the cut lawn or grass coming from the discharge duct 33a is guided by the guide cover 33 to the opening of the grass collector bags 30, while the cover plate 42 ensures that it does not fall onto the engine hood 41.

As shown in FIGS. 1, 3 and 6, the lower end of the left and right support bar groups 50 is linked to a bracket 52 fixed to the rear end 3a of the vehicle frame 3. Each of the left and right support bar groups 50 further includes a main support bar 51 and a pair of auxiliary support bars 54 and 55. The main support bar 51 is linked to a bracket 53, which is fastened to the rollover protection frame 10. The pair of auxiliary support bars 54 and 55 is positioned to the rear of the main support bar 51 and is arranged such that the greater part of them is located further inward with respect to the vehicle than the grass collector bags 30 lodged into the grass collector bag holders 39.

As shown in FIGS. 3 and 6, the upper end of the main support bars 51 is linked via the brackets 37 to the linking portion 31b of the bag support frame 31.

The first auxiliary support bar 54 is a bent support bar made of a longitudinal support bar portion 54a extending in the vehicle's longitudinal direction and a support bar portion 54c extending in vertical direction. The front end of the longitudinal support bar portion 54a is linked to the bracket 56 fixed to the lower end of the main support bar 51. The vertical support bar portion 54c extends in the vehicle's vertical direction upward from a rear end portion 54b of the longitudinal support bar portion 54a, and is linked at its end to the rear end of the inner support arm 31c of the grass collector bag holder 39.

The rear end portion 54b of the longitudinal support bar portion 54a of the first auxiliary support bar 54 is arranged such that it is positioned to the side of the lower portion the grass collector bag 30, protruding further in the vehicle's rearward direction than a rear end 43a of a rear bumper 43 or a rear end 41a of the engine hood 41, which is the rear end of the engine compartment 7, when looking at the vehicle from the side, so that it functions as a stopper portion with respect to the grass collector bag 30. That is to say, even if the grass collector bag 30 swings toward the vehicle side due to swaying of the vehicle or because the grass collector bag 30 touches the ground, the corner portion 30a of the lower portion of the grass collector bag 30 at the vehicle's rear side can be prevented from moving inwardly beyond the lateral edge of the engine hood 41 of the engine compartment 7 or the rear bumper 43 and from entering the space directly behind the engine compartment 7. Consequently, the rear end portion 54b functions as a stopper portion, and abuts against the corner portion 30a of the grass collector bag 30 from the vehicle side.

The other second auxiliary support bar 55 of the pair of auxiliary support bars 54 and 55 is a straight support bar that is oriented diagonally rising toward the rear when viewed from the vehicle's side. The lower end of this second auxiliary support bar 55 is fixed to the bracket 56 of the main support bar 51, together with the front end of the longitudinal support bar portion 54a of the first auxiliary support bar 54. The upper end of this second auxiliary support bar 55 is fixed to the rear end of the inner support arm 31c of the grass collector bag holder 39, together with the extension of the vertical support bar portion 54c of the first auxiliary support bar 54.

That is to say, in the support bar groups 50, the lower end of the main support bars 51 is supported by the rear end 3a of the vehicle frame 3, and the upper end of the main support bars 51 is supported by the rollover protection frame 10. The upper side of the main support bars 51 is linked to the linking portion 31b of the bag support frame 31 constituting the grass collector bag holder 39, so that the front side of the grass collector bag holder 39 is supported by these main support bars 51. Furthermore, the lower sides of the first auxiliary support bars 54 and the second auxiliary support bars 55 are supported by the vehicle body via the main support bars 51. The upper sides of the first auxiliary support bars 54 and the second auxiliary support bars 55 are linked to the rear ends of the inner support arms 31c of the grass collector bag holders 39, so that the rear side of the grass collector bag holders 39 is supported by the first auxiliary support bars 54 and the second auxiliary support bars 55.

Even when the grass collector bags 30 swing towards the vehicle, the stopper portion made of the rear end portion 54b of the longitudinal support bar portions 54a of the first auxiliary support bars 54 block the grass collector bags 30, thus preventing that the corner portions 30a of the grass collector bags 30 enter the space directly behind the engine compartment 7.

The exhaust outlet 44 shown in FIG. 4 is for discharging engine exhaust fumes from an exhaust muffler (not shown in the drawings) of the engine 6. The sealing plate 45 shown in FIG. 6 is linked via the linking arms 36 to the guide cover 33, and with the guide cover 33 lowered and closed as shown in FIG. 3, the sealing plate 45 abuts against the sheet metal strip 38, so that it provides a seal between the grass collector bags 30 and the guide cover 33, ensuring that no cut lawn or grass escapes.

Figure 8:
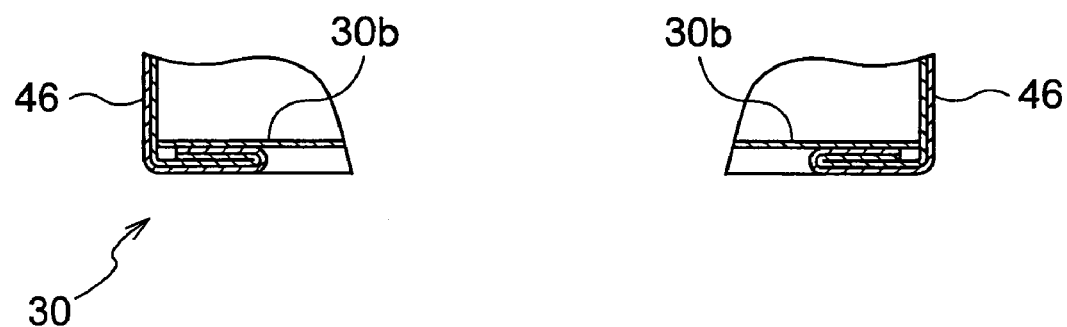
FIG. 8 is a cross-sectional view showing a structure in which a reinforcing cloth is attached to the grass collector bag's floor portion.

As shown in FIG. 6, a reinforcing cloth 46 is provided around the lower part of the peripheral wall of the grass collector bags 30, and as shown in FIG. 7, a reinforcing cloth strip 47 is provided at the floor portion 30b of the grass collector bags 30. The reinforcing cloth 46 is sewn on so that it encloses the lower part of the peripheral wall entirely, and as shown in FIG. 8, it is partly folded over below the floor portion 30b of the grass collector bag, providing it with a double cloth structure so that it is difficult to rupture even when this lower part of the surrounding wall touches the vehicle or the ground. The reinforcing cloth strip 47 is disposed from one side of the floor portion 30b across to the other side opposite thereto, thereby providing the floor portion 30b with greater strength.

Referring to the accompanying drawings, the following is an explanation of another embodiment of the present invention. Here, parts that are the same as in the above-described embodiment are denoted by the same reference numerals, and their further explanation has been omitted.

Figure 9:
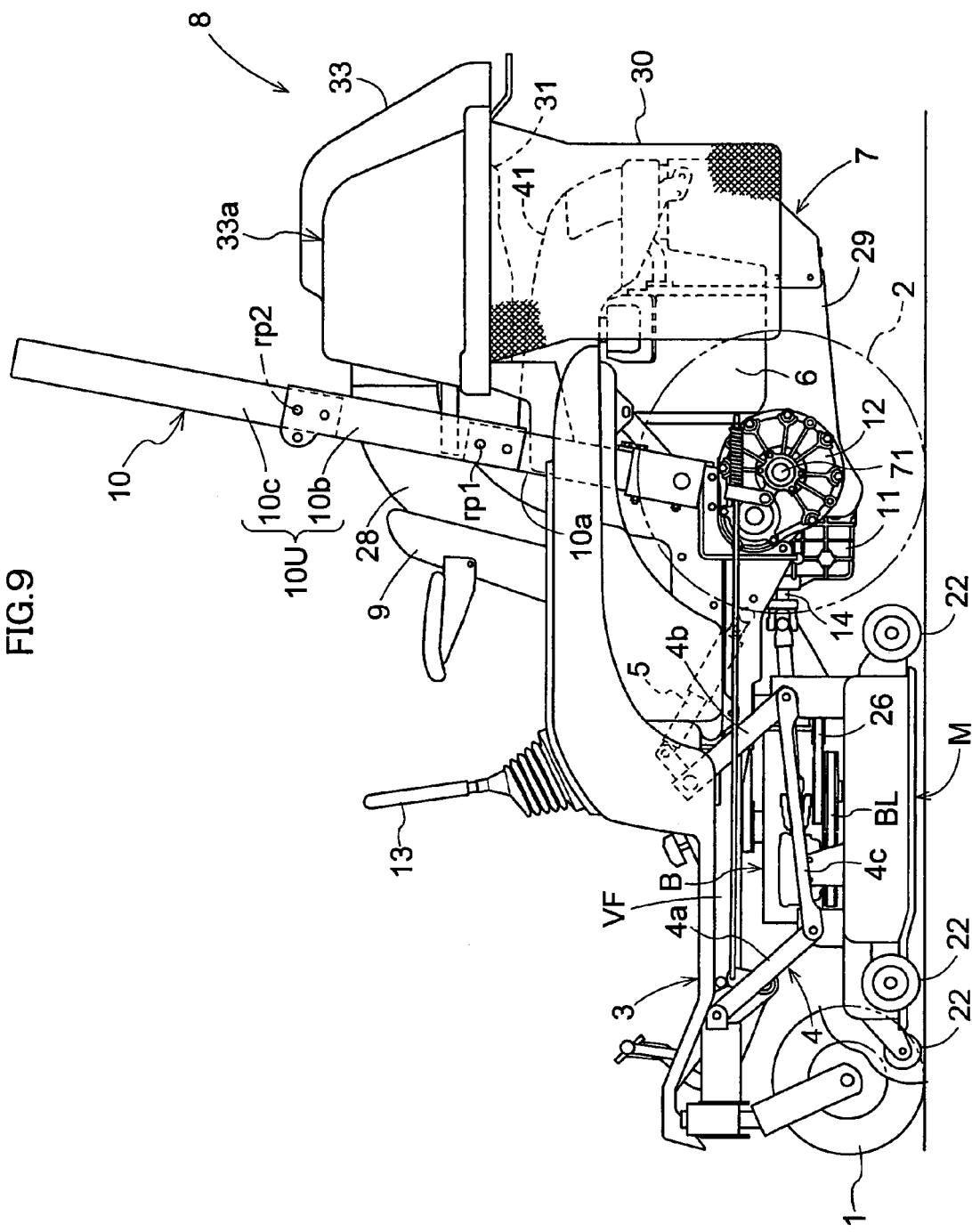
FIG. 9 is an overall lateral view of a riding-type mower tractor according to another embodiment.
Figure 10:
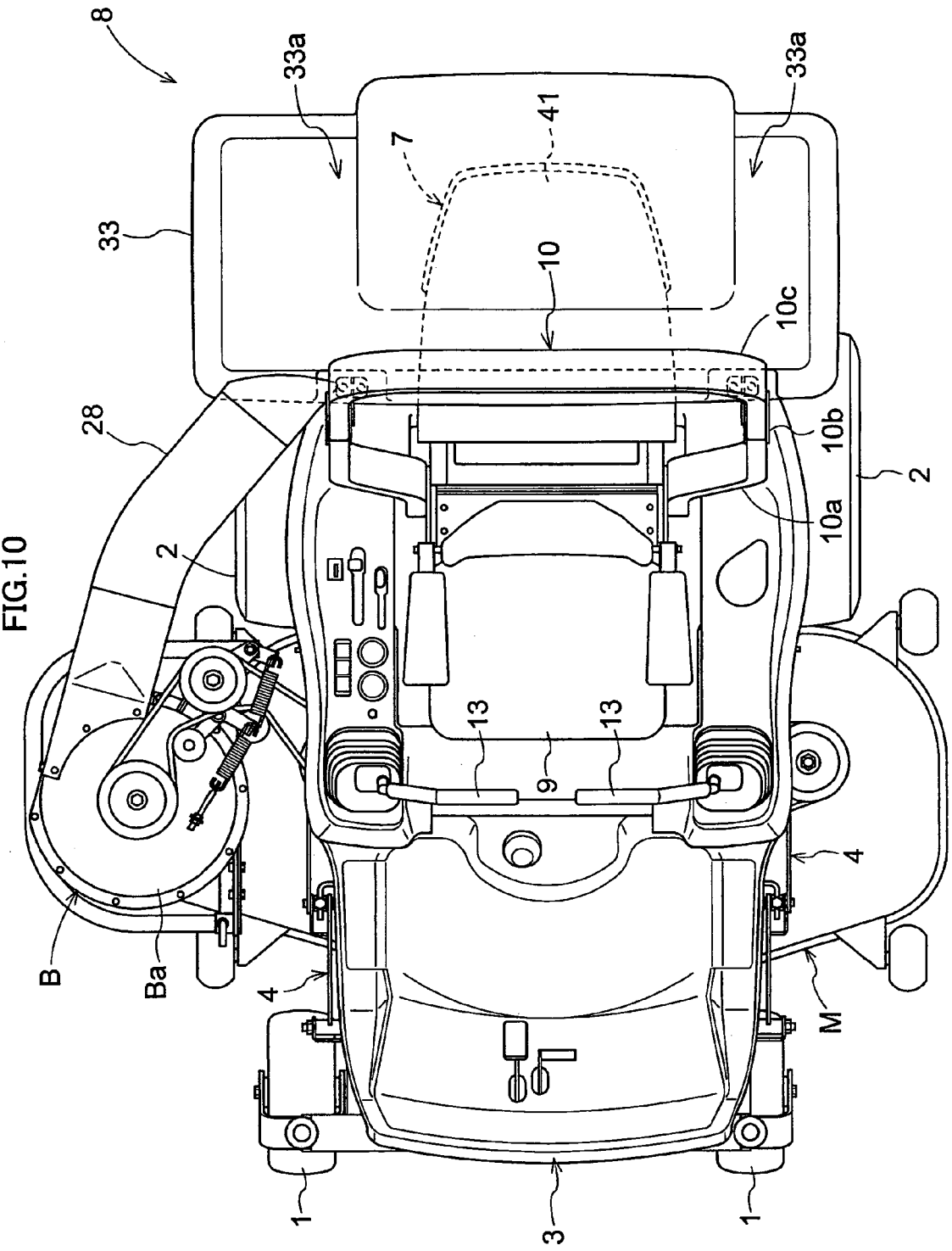
FIG. 10 is an overall top view of this riding-type mower tractor.

FIG. 9 shows an overall lateral view and FIG. 10 shows a top view of a riding type mower tractor according to this other embodiment.

A portal-shaped rollover protection frame (ROPS) 10 is erected between the driver seat 9 and the engine compartment 7, and a grass collector 8 for collecting cut grass is mounted using this portal-shaped rollover protection frame 10.

Figure 11:
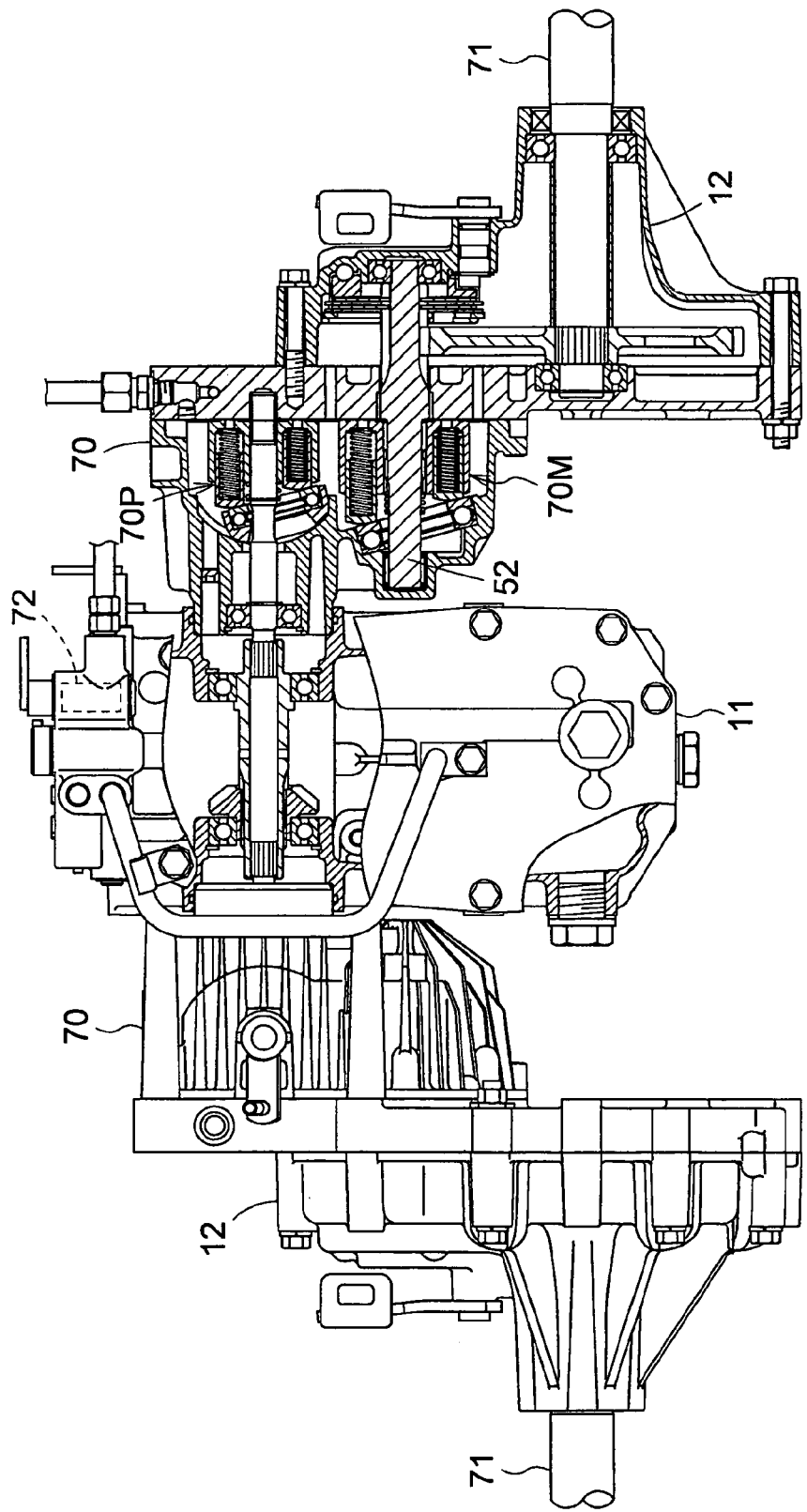
FIG. 11 is a partially cut-away rear view of a transmission portion.

As shown in FIG. 11, the output of the engine 6 is input into a counter case 11, and split into travel motion power and work power. The travel motion power is input into respective pumps 70P of a left and a right hydrostatic transmission (HST) 70 arranged on the left and right sides of the counter case 11, and the shifted output from the motor portions 70M of the hydrostatic transmissions 70 is respectively transmitted individually via speed reducing cases 12 to the axle shafts 71 of the left and right gear wheels 2. Then the hydrostatic transmissions 70 driving the left and right rear wheels 2 can shift the left and right rear wheels 2 independently and steplessly between forward and backward travel motion by independently shifting the left and right operating levers, which are provided to the left and the right of the driver seat 9 and which can be tilted frontward and rearward. Depending on how far the left and right operating levers 13 are pushed down, it is possible to drive the vehicle straight forward or backward, to drive a curve by applying a speed difference to the left and right rear wheels 2, a pivot turn by stopping one of the rear wheels 2, or a spin turn by driving the left and right rear wheels 2 in opposite directions. Moreover, the work power that has been branched off, is output to the front from a PTO shaft 14 (see FIG. 1) protruding at the front lower portion of the counter case 11, and transmitted to the mower M.

Figure 12:
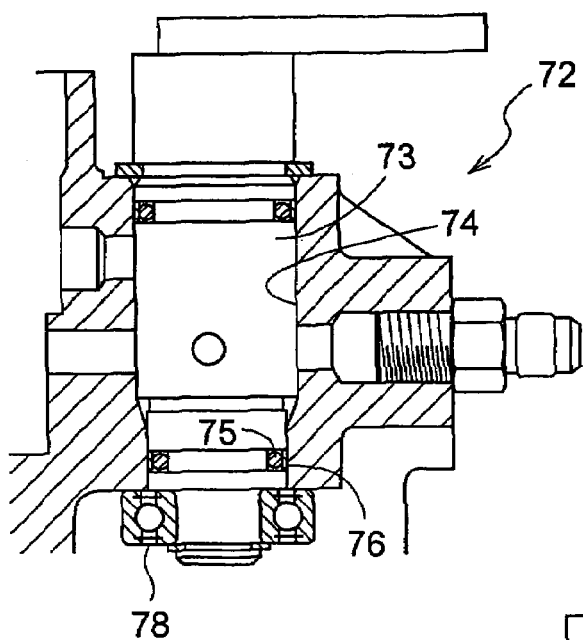
FIG. 12A is a vertical cross-sectional view of a switching valve and FIG. 12B is an exploded vertical cross-sectional view thereof.
Figure 12:
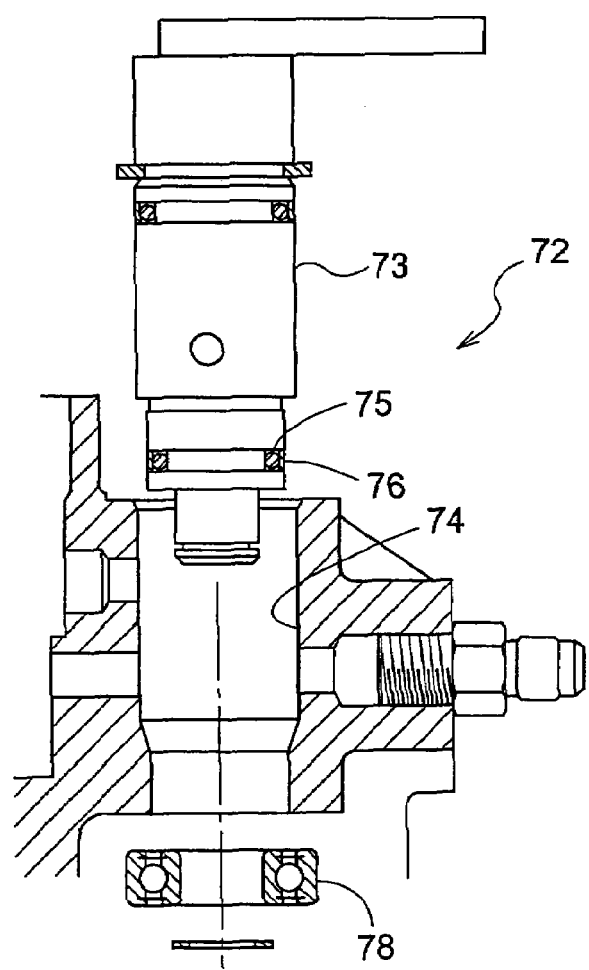
Figure 13:
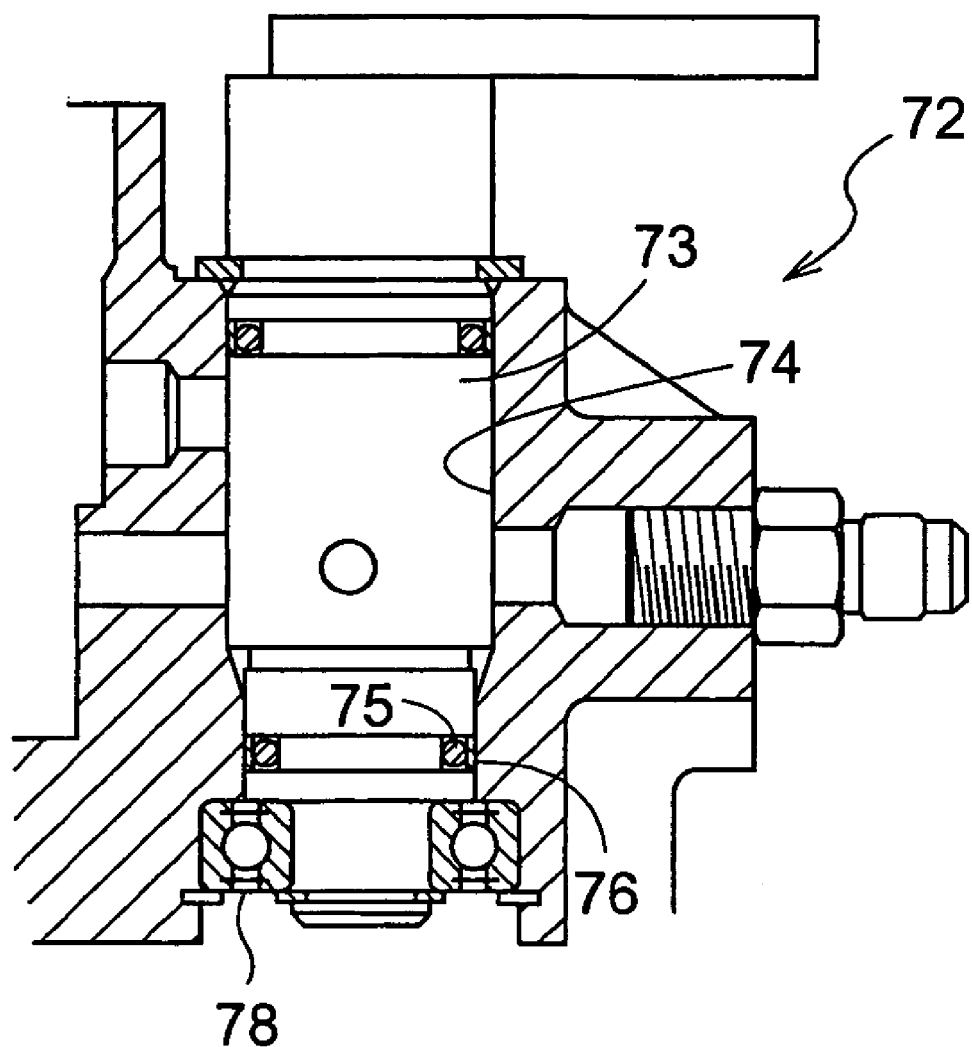
FIG. 13 is a vertical cross-sectional view showing a switching valve according to another embodiment.

It should be noted that a switching valve 72 for exchanging the oil in the hydraulic cylinder is provided in the upper portion of the counter case 11. As shown in FIG. 12A, this switching valve 72 has a rotary-type configuration, in which the flow path is switched by turning a spool 73 around its vertical axis. The spool 73, whose lower portion is provided with a small diameter step, is fitted from above into a mounting hole 74, also provided with a step. With this configuration, when the spool 73 is inserted from the upper aperture into the mounting hole 74 while an O-ring 75 and a seal ring 76 are fitted to the large diameter portion and the small diameter portion, as shown in FIG. 12B, the seal ring 76 fitted into the small diameter portion of the spool 73 does not get caught at the upper aperture of the mounting hole 74, thus allowing smooth assembly. If the spool 73 is provided with a step, then the internal hydraulic pressure exerts an upward force on the spool 73, but by countering this force with a bearing 78 that is mounted to the spool's lower end, the spool 73 can be easily rotated. In this case, the bearing 78 is attached inside the case, as shown in FIG. 13.

Figure 14:
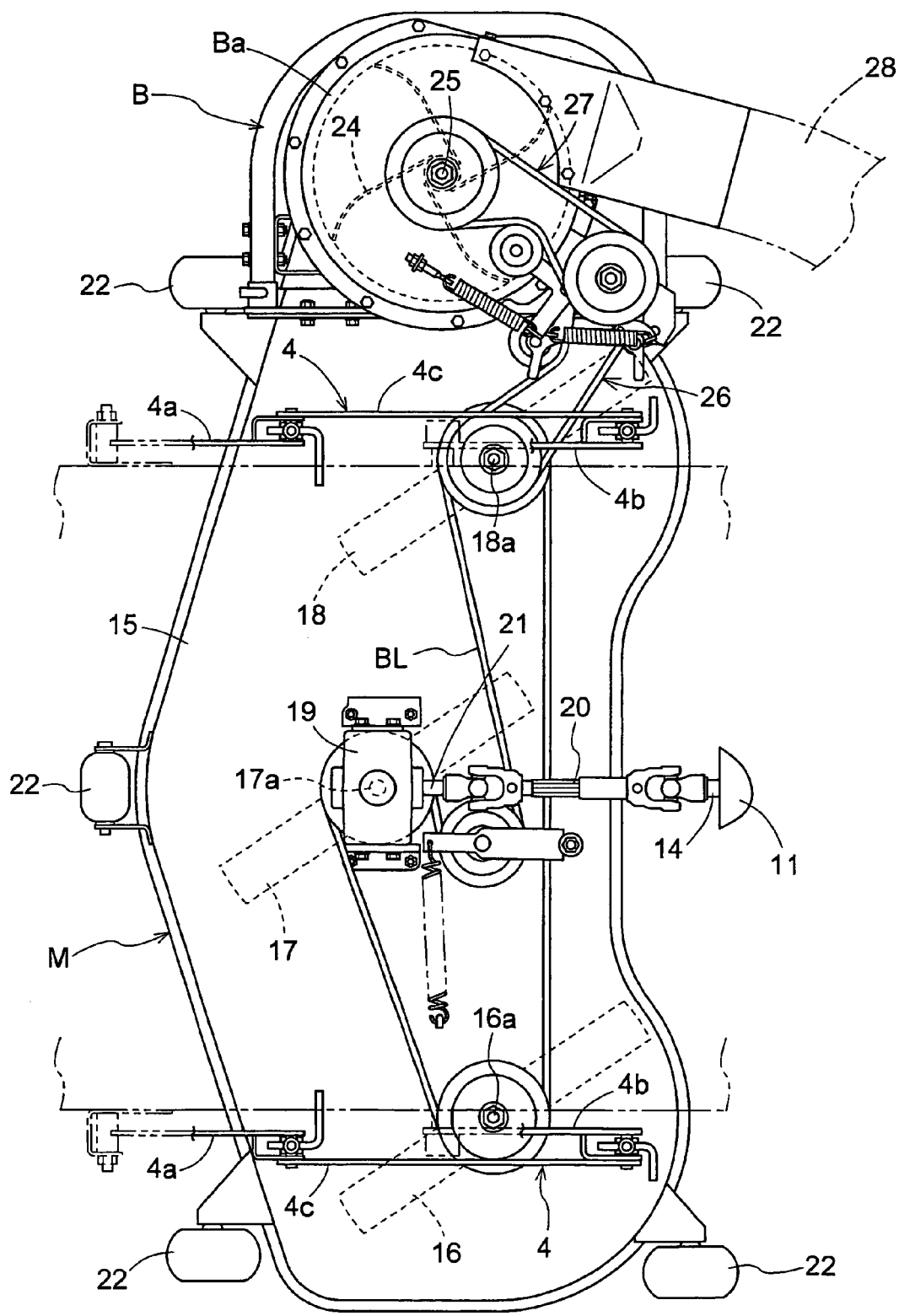
FIG. 14 is a top view of a mower.

As shown in FIG. 14, the mower M is provided with three blades 16, 17 and 18 that are rotationally driven in the same direction around vertical axes and that are lined up next to one another inside a deck 15 that opens in downward direction. The deck 15, which is devised as a flat deck with the height of the top plate being set overall to the same height, is provided with a cut grass discharge port at its right end.

The operating power that is delivered from the PTO shaft 14 is transmitted via a shaft transmission mechanism 20 that can be bent as well as expanded and contracted to a bevel gear case 19 arranged at the central upper surface of the deck 15. The rotational power that is converted into a vertical axial rotation by the bevel gear case 19 is transmitted to a rotation shaft 17a of the blade 17. This rotation shaft 17a and the rotation shafts 16a and 18a of the left and right blades 16 and 18 are linked by a belt BT wound around them, and all rotation blades 16, 17 and 18 are rotationally driven in the same direction (clockwise when looking from above), so that the front half of the rotation trajectories of the rotation blades 16, 17 and 18 points toward the cut grass discharge port (i.e. to the right). Anti-scalp rollers 22 for helping the mower tractor over obstacles are arranged around the deck 15.

A blower B for transporting the cut grass that is discharged from the cut grass discharge port toward the grass collector 8 at the rear of the vehicle is detachably provided at the right end of the deck 15 of the mower M. In this blower B, a rotation shaft 25 of a rotating vane 24 mounted rotatably around its vertical axis inside a casing Ba and the rotation shaft 18a of the right rotation blade 18 are operatively linked through a first belt transmission mechanism 26 with a tension clutch and a self-tensioning second belt transmission mechanism 27, and the front end of a duct 28 for transporting the cut grass is inserted to and linked to the casing Ba.

Figure 15:
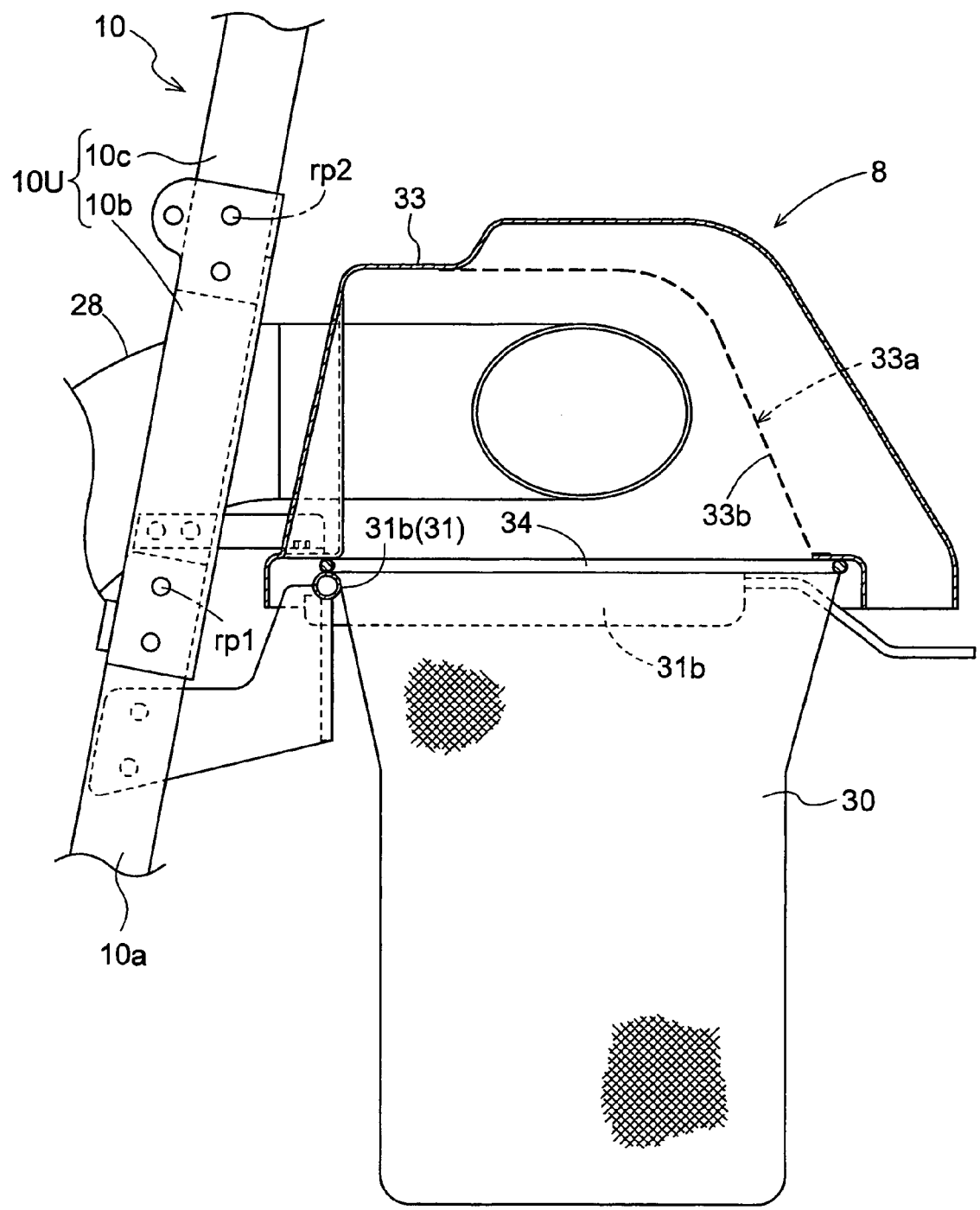
FIG. 15 is a lateral view of a grass collector.
Figure 17:
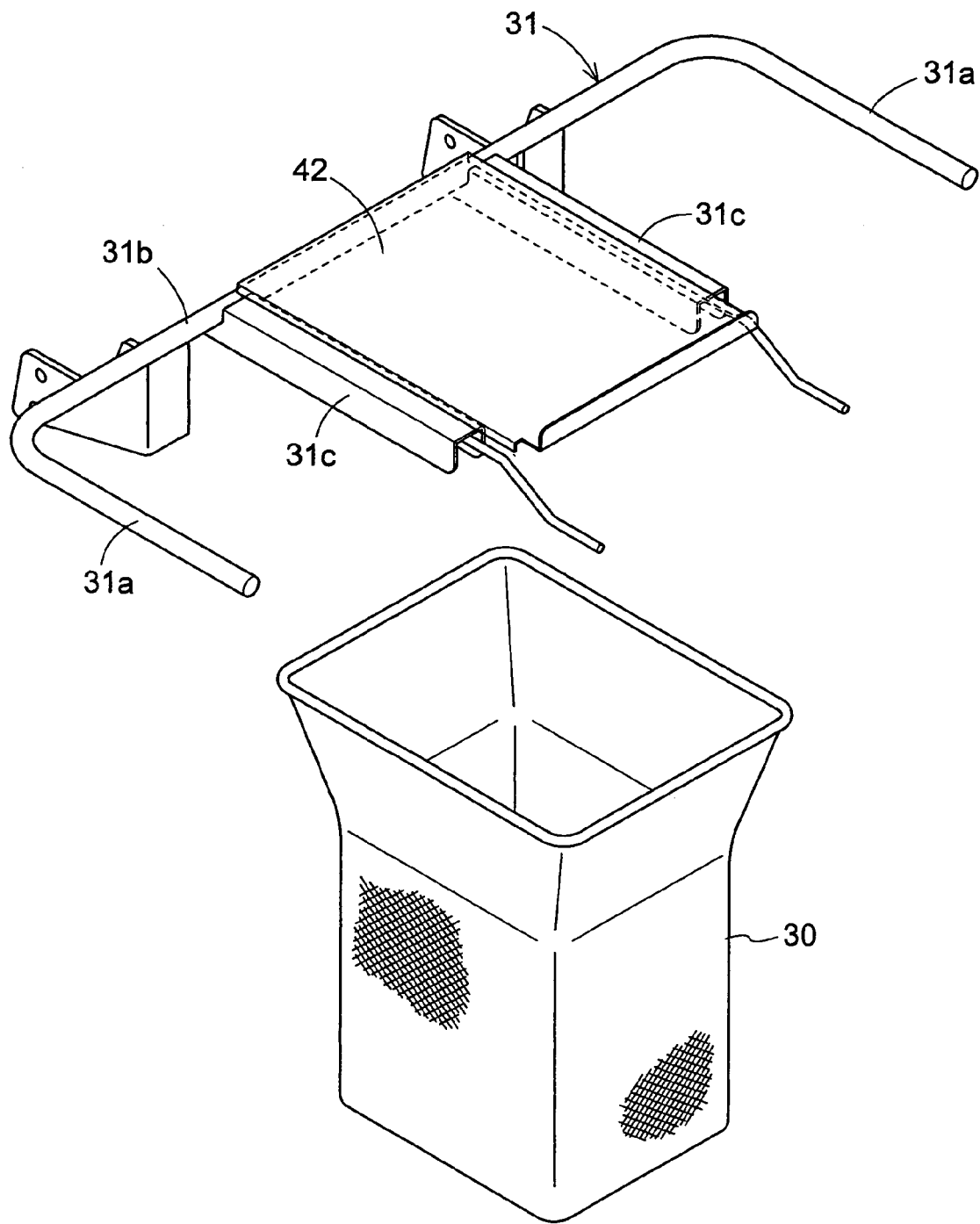
FIG. 17 is an oblique exploded view showing the grass collector container support structure of the grass collector.

The grass collector 8 is configured such that the cut grass that has been guided up through the duct 28 is collected in the two grass collector bags 30 lodged to the left and right of the engine compartment 7, and, as shown in FIG. 15, the grass collector 8 is supported by the rollover protection frame 10 in the following-manner:

The rollover protection frame 10 is made of lower frame portions 10a, which are erected to the left and right of the vehicle frame, and an upward frame portion 10U, which is pivotably linked to the upper end of the lower frame portions 10a so that it can be tilted in frontward direction around a fulcrum rp1. The upward frame portion 10U is made of left and right middle frame portions 10b and an upper frame portion 10c that is pivotably linked to the upper end of the middle frame portions 10b so that it can be tilted in rearward direction around a fulcrum rp2. The support frame 31 (see FIG. 17) is attached and fixed to the lower frame portions 10a. The upper frame portion 10c includes a pair of legs extending upward, and an overall horizontal portion connecting these legs.

The guide cover 33 has such a lateral width and longitudinal width that it covers the upper openings of the grass collector bags 30, which are an example of left and right grass collector containers. The guide cover 33 is provided with a shape that overall opens downward, and is attached and fixed to the middle frame portions 10b of the rollover protection frame 10.

Figure 16:
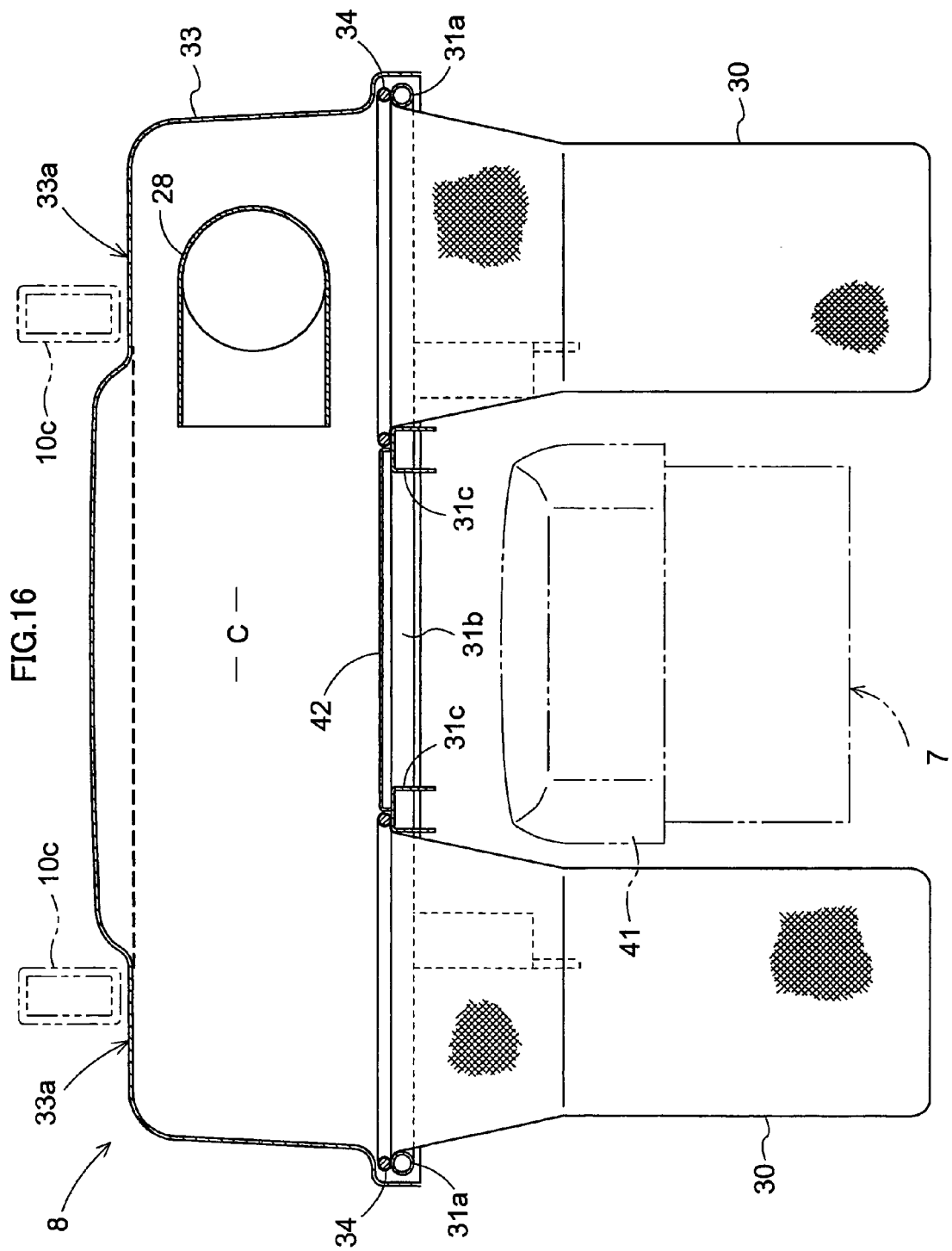
FIG. 16 is a vertical cross-sectional rear view of the grass collector.

As shown in FIG. 16, the outer support arms 31a and the inner support arms 31c to which the left and right grass collector bags 30 are mounted are disposed at a position that is slightly higher than the engine hood 41 of the engine compartment 7, and the cover plate 42 spans the inner support arms 31c, thus covering the engine hood 41. When the guide cover 33 is lowered, this cover plate 42 forms a tunnel path C inside the guide cover 33, connecting the spaces above the left and right container mounting locations, so that the cut grass that is cast through the duct 28 to the right side of the guide cover 33 is guided by the guide cover 33 to the left and right grass collector bags 30. The air draft transporting the cut grass that is blown into the guide cover 33 is exhausted through a mesh-shaped exhaust port 33b formed at a rear half inner surface of the guide cover 33, out to the discharge duct 33a and exhausted in downward direction at the rear.

Figure 18:
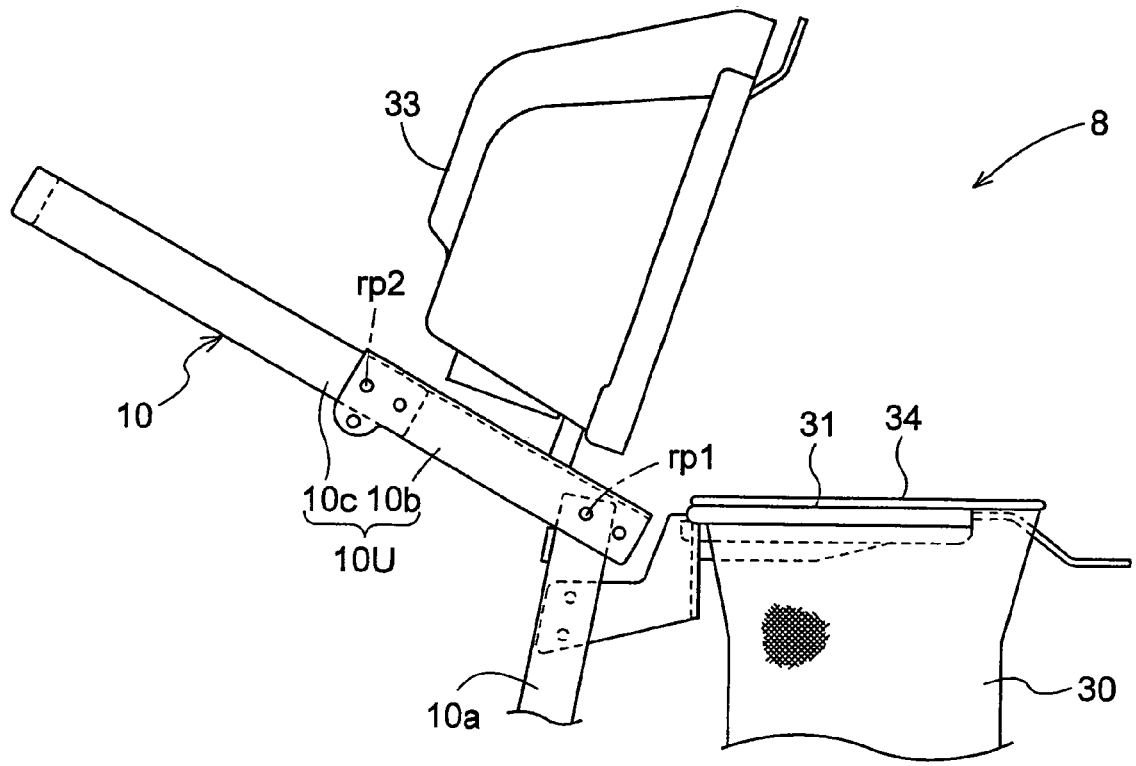
FIG. 18A is a lateral view of the grass collector with the guide cover open.
FIG. 18B is a lateral view of the grass collector with the rollover protection frame folded over.
Figure 18:
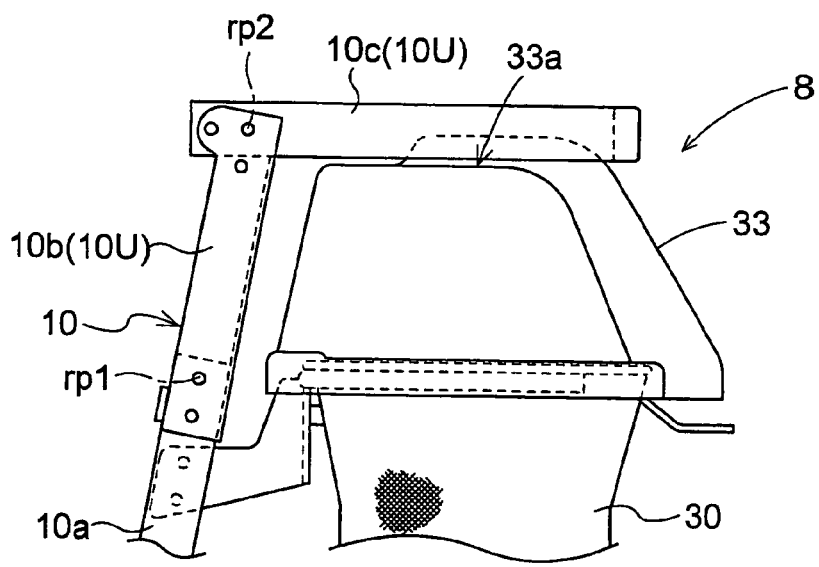

As shown in FIG. 18A, by rotating the upward frame portion 10U frontward around the fulcrum rp1, the guide cover 33, which is linked to this upward frame portion 10U, can be opened widely from above, making it possible to lodge or dislodge the grass collector bags 30.

And as shown in FIG. 18B, by folding only the upper frame portion 10c of the upward frame portion 10U of the rollover protection frame 10 rearward around the fulcrum rp2, it is possible to drive the vehicle under trees with low-hanging branches and cut grass around the trunks of such trees. Recesses 33a, in which the upper frame portions 10c can be fitted when folded over to the rear, are formed on the top of the guide cover 33, so that the upper frame portions 10c can be collapsed down far, and the rollover protection frame 10 can be folded to a low position.

Figure 19:
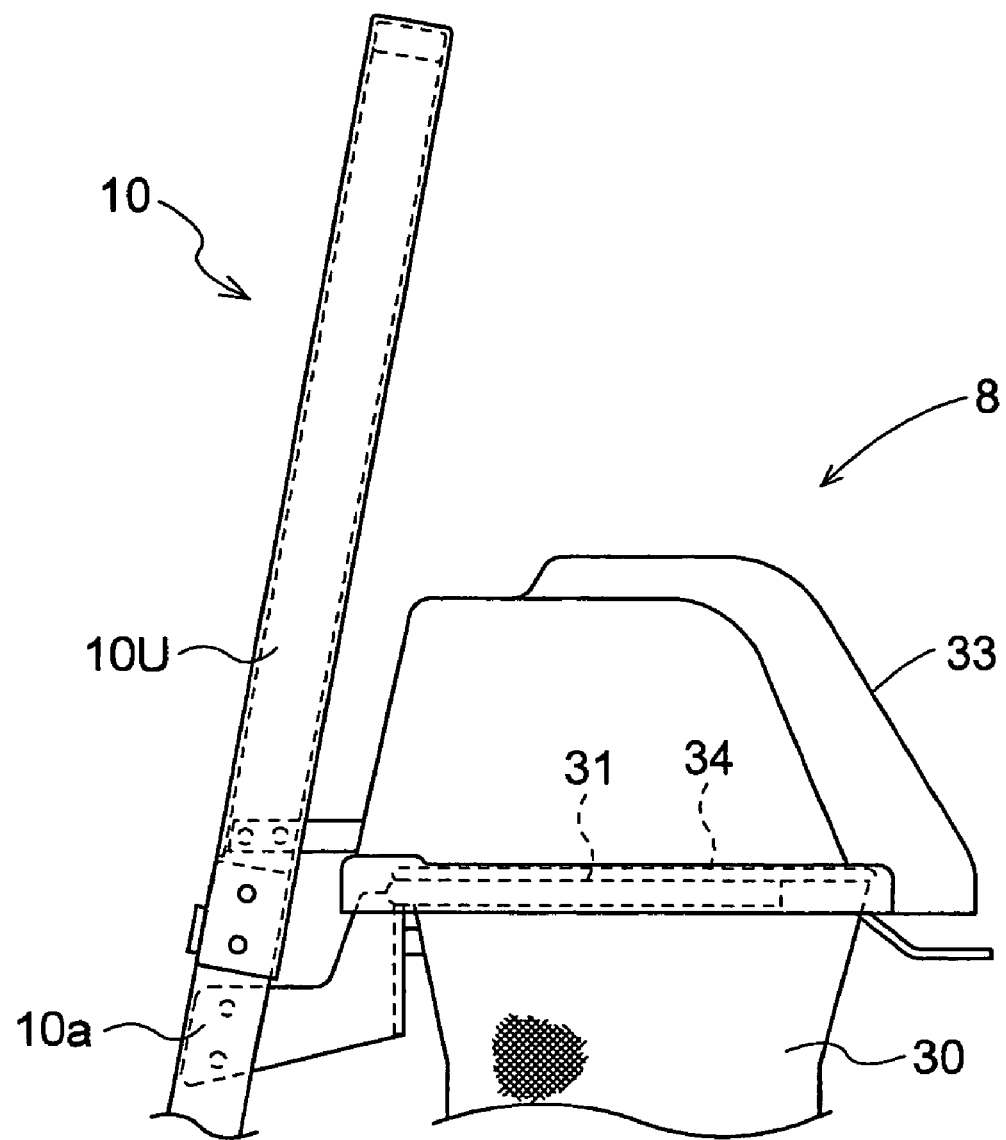
FIG. 19 is a lateral view of a grass collector provided with a rollover protection frame according to another embodiment.

Further Embodiments (1) In vehicle types that are not laid out for cutting grass below trees, it is also possible to provide the upward frame portion 10U of the rollover protection frame 10 with an integral structure that is not partitioned vertically, as shown in FIG. 19, and to attach the guide cover 33 to this upward frame portion 10U.

Figure 20:
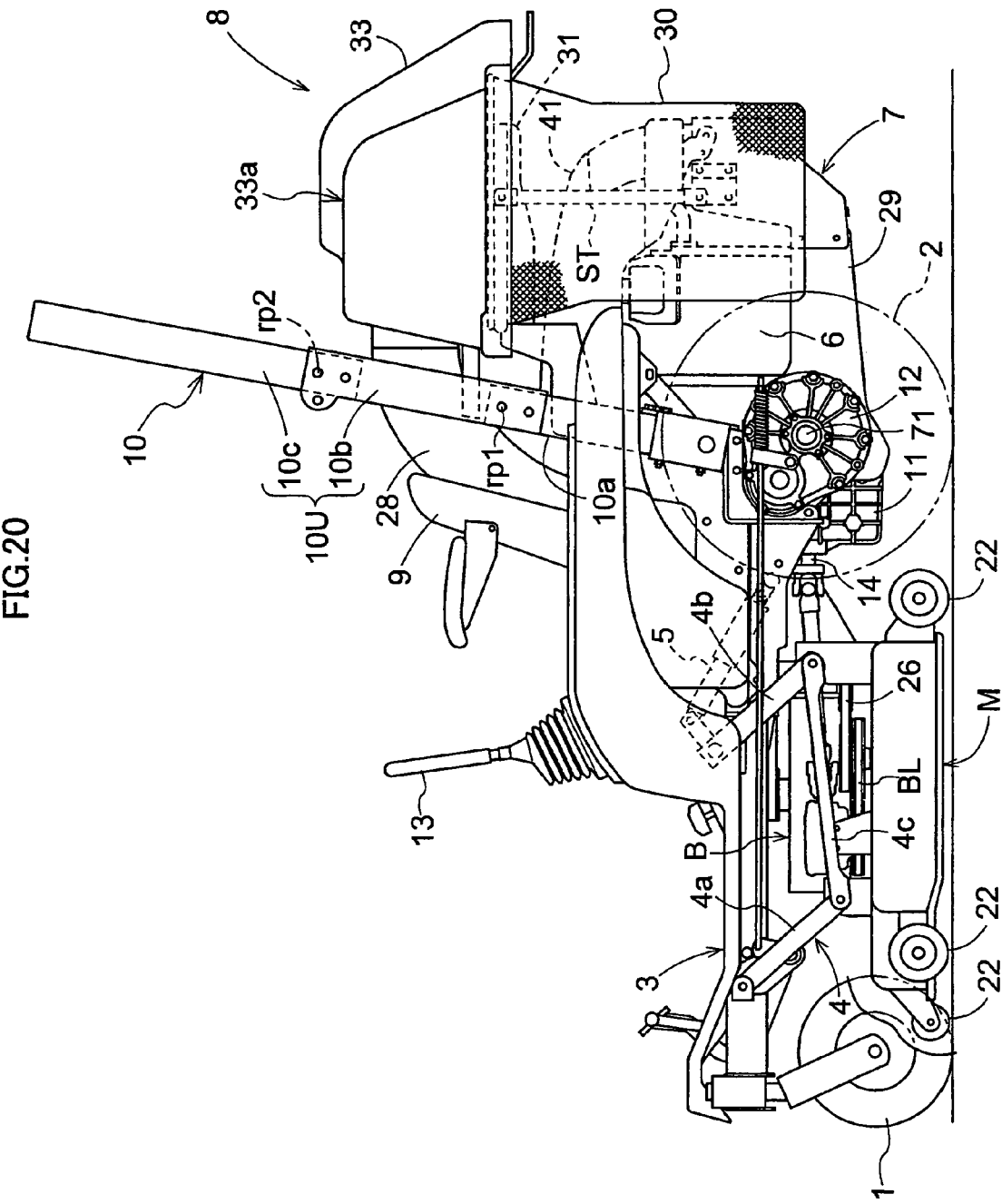
FIG. 20 is an overall lateral view of a riding-type mower tractor provided with a grass collector according to yet another embodiment.

(2) As shown in FIG. 20, with a configuration in which the support frame 31 provided with the linking portion 31b and the container support arms 31a and 31c is linked to and supported by the lower frame portion 10a of the rollover protection frame 10 and reinforced by a stay ST that is erected from an engine mounting frame 29, grass collector bags 30 with an even larger capacity can be supported.

What is claimed is:

1. A mower tractor comprising:
a vehicle body supported by a plurality of wheels;
a driver's seat supported by the vehicle body;
an engine mounted to the vehicle body at a position rearwardly of the driver's seat;
a mower suspended from the vehicle body;
at least one grass collector bag for collecting grass cut by the mower;
a grass collector bag holder supporting said at least one grass collector bag such that at least a part of the at least one grass collector bag overlaps with the engine in a side view;
a stopper portion that is bar-shaped in both the side view and a rear view, said bar-shaped stopper portion being located at such a position that the bar-shaped stopper portion overlaps with a lower rearward region of the grass collector bag in a side view for abutting against the grass collector bag on the lower rearward region of the grass collector bag so as to prevent the grass collector bag supported by the grass collector bag holder from moving laterally toward the vehicle body;
wherein the grass collector bag holder comprises a first support bar arranged laterally between said at least one grass collector bag and the vehicle body and the bar-shaped stopper portion is provided in the first support bar;

wherein the grass collector bag holder supports the grass collector bag such that the grass collector bag is suspended at a position to the side of a rear end portion located behind the rear wheels of the vehicle body;

wherein the first support bar is a bent support bar comprising a longitudinal support bar portion extending in the vehicle body's longitudinal direction, and a vertical support bar portion extending vertically in the vehicle body's vertical direction from a rear end of the longitudinal support bar portion; and wherein the bar-shaped stopper portion is the rear end portion of the longitudinal support bar portion, and the rear end portion of the longitudinal support bar portion protrudes rearwardly of the vehicle body.

2. The mower tractor according to claim 1, wherein a lower edge of the stopper portion is at a higher level than a bottom of the collector bag.

3. A mower tractor comprising:
a vehicle body supported by a plurality of wheels;
a driver's seat supported by the vehicle body;
an engine mounted to the vehicle body at a position rearwardly of the driver's seat;
a mower suspended from the vehicle body;
at least one grass collector bag for collecting grass cut by the mower;
a grass collector bag holder supporting said at least one grass collector bag such that at least a part of the at least one grass collector bag overlaps with the engine in a side view;
a stopper portion located at such a position that the stopper portion overlaps with a lower rearward region of the grass collector bag in a side view for abutting against the grass collector bag on the lower rearward region of the grass collector bag so as to prevent the grass collector bag supported by the grass collector bag holder from moving laterally toward the vehicle body, wherein the stopper portion has substantially no lateral extension;
wherein the grass collector bag holder has a first support bar that is located between the at least one grass collector bag and the vehicle body and that includes the stopper portion, wherein the first support bar includes a longitudinal support bar portion that extends along a longitudinal direction of the vehicle body;
wherein a lower edge of the stopper portion is at a higher level than a bottom of the collector bag; and
wherein a lower edge of the longitudinal support bar portion is at a higher level than a bottom of the collector bag.

4. The mower tractor according to claim 3, wherein the stopper portion is bar-shaped in both the side view and a rear view.

5. A mower tractor comprising:
a vehicle body supported by a plurality of wheels;
a driver's seat supported by the vehicle body;
an engine mounted to the vehicle body at a position rearwardly of the driver's seat;
a mower suspended from the vehicle body;
at least one grass collector bag for collecting grass cut by the mower;
a grass collector bag holder supporting said at least one grass collector bag such that at least a part of the at least one grass collector bag overlaps with the engine in a side view;
a stopper portion that is bar-shaped in both the side view and a rear view, said bar-shaped stopper portion being located at such a position that the bar-shaped stopper portion overlaps with a lower rearward region of the grass collector bag in a side view for abutting against the grass collector bag on the lower rearward region of the grass collector bag so as to prevent the grass collector bag supported by the grass collector bag holder from moving laterally toward the vehicle body;

wherein the grass collector bag holder comprises a first support bar arranged laterally between said at least one grass collector bag and the vehicle body and the bar-shaped stopper portion is provided in the first support bar;

wherein the grass collector bag holder supports the grass collector bag such that the grass collector bag is suspended at a position to the side of a rear end portion located behind the rear wheels of the vehicle body;

wherein the first support bar is a bent support bar comprising a longitudinal support bar portion extending in the vehicle body's longitudinal direction, and a vertical support bar portion extending vertically in the vehicle body's vertical direction from a rear end of the longitudinal support bar portion; and wherein said grass collector bag holder further comprises a straight second support bar whose lower end is linked to a position on a side of the vehicle body together with a front end of the longitudinal support bar portion and whose upper end is linked to the grass collector bag holder together with the upper end of the vertical support bar portion.

6. A mower tractor comprising:
a vehicle body supported by a plurality of wheels;
a driver's seat supported by the vehicle body;
an engine mounted to the vehicle body at a position rearwardly of the driver's seat;
a mower suspended from the vehicle body;
at least one grass collector bag for collecting grass cut by the mower;
a grass collector bag holder supporting said at least one grass collector bag such that at least a part of the at least one grass collector bag overlaps with the engine in a side view;
a stopper portion that is bar-shaped in both a side view and a rear view, said bar-shaped stopper portion being located at such a position that the bar-shaped stopper portion overlaps with a lower rearward region of the grass collector bag in a side view for abutting against the grass collector bag on the lower rearward region of the grass collector bag so as to prevent the grass collector bag supported by the grass collector bag holder from moving laterally toward the vehicle body;

wherein the grass collector bag holder comprises a first support bar arranged laterally between said at least one grass collector bag and the vehicle body and the bar-shaped stopper portion is provided in the first support bar;

wherein the grass collector bag holder supports the grass collector bag such that the grass collector bag is suspended at a position to the side of a rear end portion located behind the rear wheels of the vehicle body;

wherein the first support bar is a bent support bar comprising a longitudinal support bar portion extending in the vehicle body's longitudinal direction, and a vertical support bar portion extending vertically in the vehicle body's vertical direction from a rear end of the longitudinal support bar portion; and wherein a lower edge of the longitudinal support bar portion is at a higher level than a bottom of the collector bag.

7. The mower tractor according to claim 6, wherein a rear edge of the vertical support bar portion is located forwardly of a rear surface of the collector bag.

8. A mower tractor comprising:
- a vehicle body supported by a plurality of wheels;
- a driver's seat supported by the vehicle body;
- an engine mounted to the vehicle body at a position rearwardly of the driver's seat;
- a mower suspended from the vehicle body;
- at least one grass collector bag for collecting grass cut by the mower;
- a grass collector bag holder supporting said at least one grass collector bag such that at least a part of the at least one grass collector bag overlaps with the engine in a side view;
- a stopper portion located at such a position that the stopper portion overlaps with a lower rearward region of the grass collector bag in a side view for abutting against the grass collector bag on the lower rearward region of the grass collector bag so as to prevent the grass collector bag supported by the grass collector bag holder from moving laterally toward the vehicle body, wherein the stopper portion has substantially no lateral extension;
- wherein the grass collector bag holder has a first support bar that is located between the at least one grass collector bag and the vehicle body and that includes the stopper portion, wherein the first support bar includes a longitudinal support bar portion that extends along a longitudinal direction of the vehicle body;
- wherein a lower edge of the longitudinal support bar portion is at a higher level than a bottom of the collector bag;
- wherein the first support bar further has a vertical support bar portion extending vertically in the vehicle body's vertical direction from a rear end of the longitudinal support bar portion; and
- wherein a rear edge of the vertical support bar portion is located forwardly of a rear surface of the collector bag.

* * * * *

UNITED STATES PATENT AND TRADEMARK OFFICE
CERTIFICATE OF CORRECTION

PATENT NO. : 7,594,378 B2
APPLICATION NO. : 11/075843
DATED : September 29, 2009
INVENTOR(S) : Asahara et al.

It is certified that error appears in the above-identified patent and that said Letters Patent is hereby corrected as shown below:

<u>Face of the Patent,</u> Item (56) References Cited, U.S PATENT DOCUMENTS, add the following:

-- 6,854,249 B1    2/2005   Samejima et al. ................56/13.3 --

Signed and Sealed this

Twenty-third Day of February, 2010

David J. Kappos
*Director of the United States Patent and Trademark Office*